US007180406B2

(12) United States Patent
Berg

(10) Patent No.: US 7,180,406 B2
(45) Date of Patent: Feb. 20, 2007

(54) ONBOARD FIRE ALERT SYSTEM

(76) Inventor: Tord Berg, Branningevagen 31, 120 58 Arsta (SE)

( * ) Notice: Subject to any disclaimer, the term of this patent is extended or adjusted under 35 U.S.C. 154(b) by 156 days.

(21) Appl. No.: 10/907,181

(22) Filed: Mar. 23, 2005

(65) Prior Publication Data

US 2005/0212678 A1 Sep. 29, 2005

(51) Int. Cl.
*B60Q 1/00* (2006.01)

(52) U.S. Cl. .................. 340/425.5; 340/577; 340/581; 340/584; 340/589; 340/438; 340/439; 340/691.6

(58) Field of Classification Search ............. 340/425.5, 340/438, 439, 449, 577, 581, 584, 588, 589, 340/628, 632, 691.6; 123/179.5–6, 179.21
See application file for complete search history.

(56) References Cited

U.S. PATENT DOCUMENTS 5,126,570 A * 6/1992 Boos .......................... 250/343
5,262,645 A * 11/1993 Lambert et al. ....... 250/339.04
6,334,418 B1 * 1/2002 Hubbard ................ 123/179.21

* cited by examiner

*Primary Examiner*—Hung Nguyen
(74) *Attorney, Agent, or Firm*—Rolf Fasth; Fasth Law Offices

(57) ABSTRACT

The method is for warning for alcohol fueled fires in vehicles such as racing vehicles. The method comprises providing a vehicle (44) with an engine (46) fueled by alcohol. Sensors (20, 22, 24) are mounted adjacent to the engine. The sensors sense a trigger temperature (54, 56, 58) of an alcohol-fueled fire (62) and send a signal to a central unit (12). The central unit activates a smoke generator (41) to generate a visible smoke (60) in response to the signal from the sensors.

9 Claims, 2 Drawing Sheets

ONBOARD FIRE ALERT SYSTEM

TECHNICAL FIELD

The present invention relates to an onboard fire alert system for warning for alcohol fueled fires that are usually not visible.

BACKGROUND OF THE INVENTION

When alcohol burns at a high temperature it generates a smoke that is almost invisible. Alcohol fueled fires may go on for many minutes without anybody discovering the fire. It is often not until an adjacent item also catches fire that conventional smoke is developed but there is a risk that substantial damage to life and item have already occurred. For example, many racing cars are fueled by alcohol and it is very difficult to discover that the engine is on fire since the smoke from the burning alcohol is virtually impossible to see for the human eye.

There is a need for a more effective way of discovering and warning for alcohol-fueled fires.

SUMMARY OF THE INVENTION

The fire alert system of the present invention provides a solution to the above-outlined problems. More particularly, the onboard fire alert system of the present invention is for warning for alcohol fueled fires in vehicles such as racing vehicles. The method comprises providing a vehicle with an engine fueled by alcohol. Sensors are mounted adjacent to the engine. The sensors sense a trigger temperature of an alcohol-fueled fire and send a signal is sent to a central unit. The central unit activates a smoke generator to generate a visible smoke in response to the signal from the sensors.

DETAILED DESCRIPTION

Figure 1:
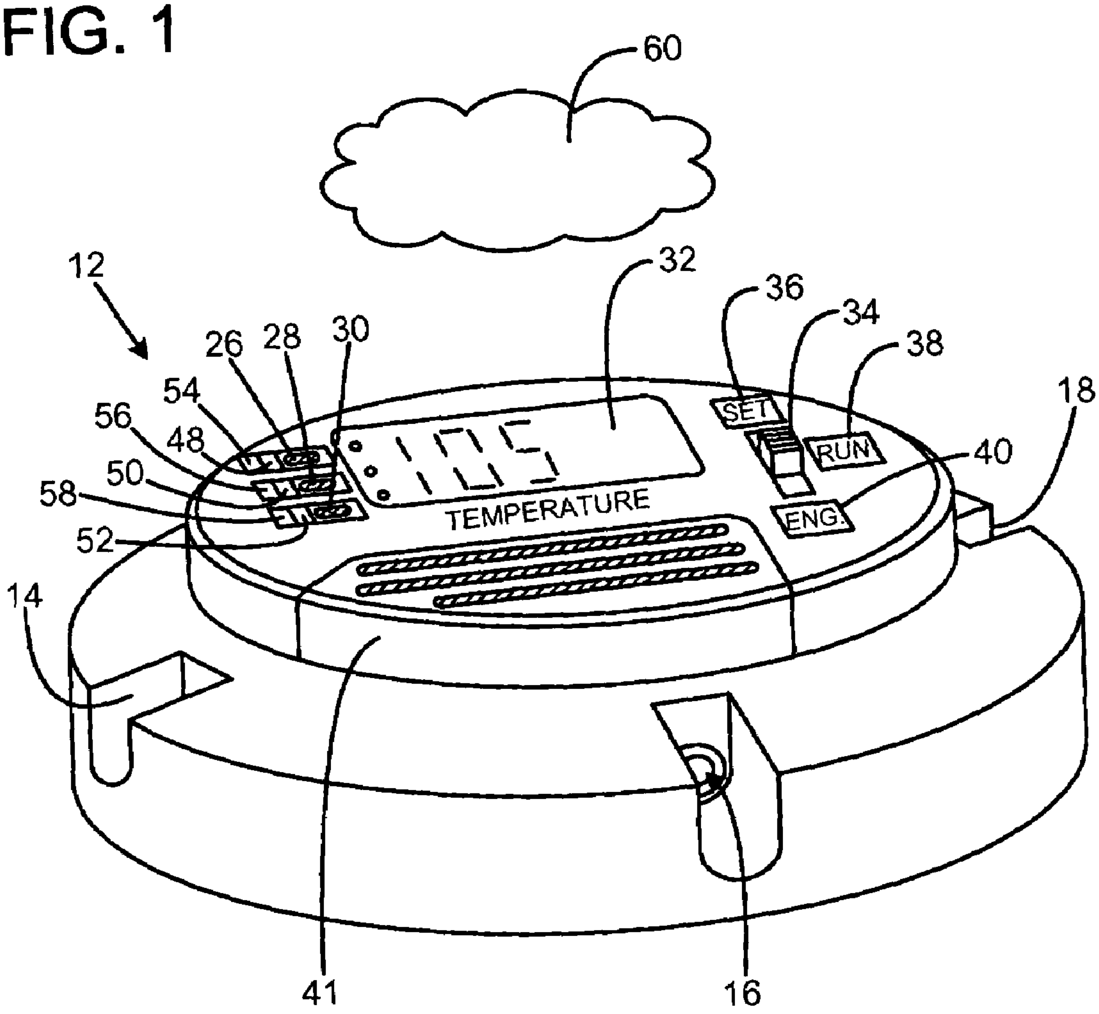
FIG. 1 is a perpendicular view of the central warning unit of the fire alert system of the present invention.
Figure 2:
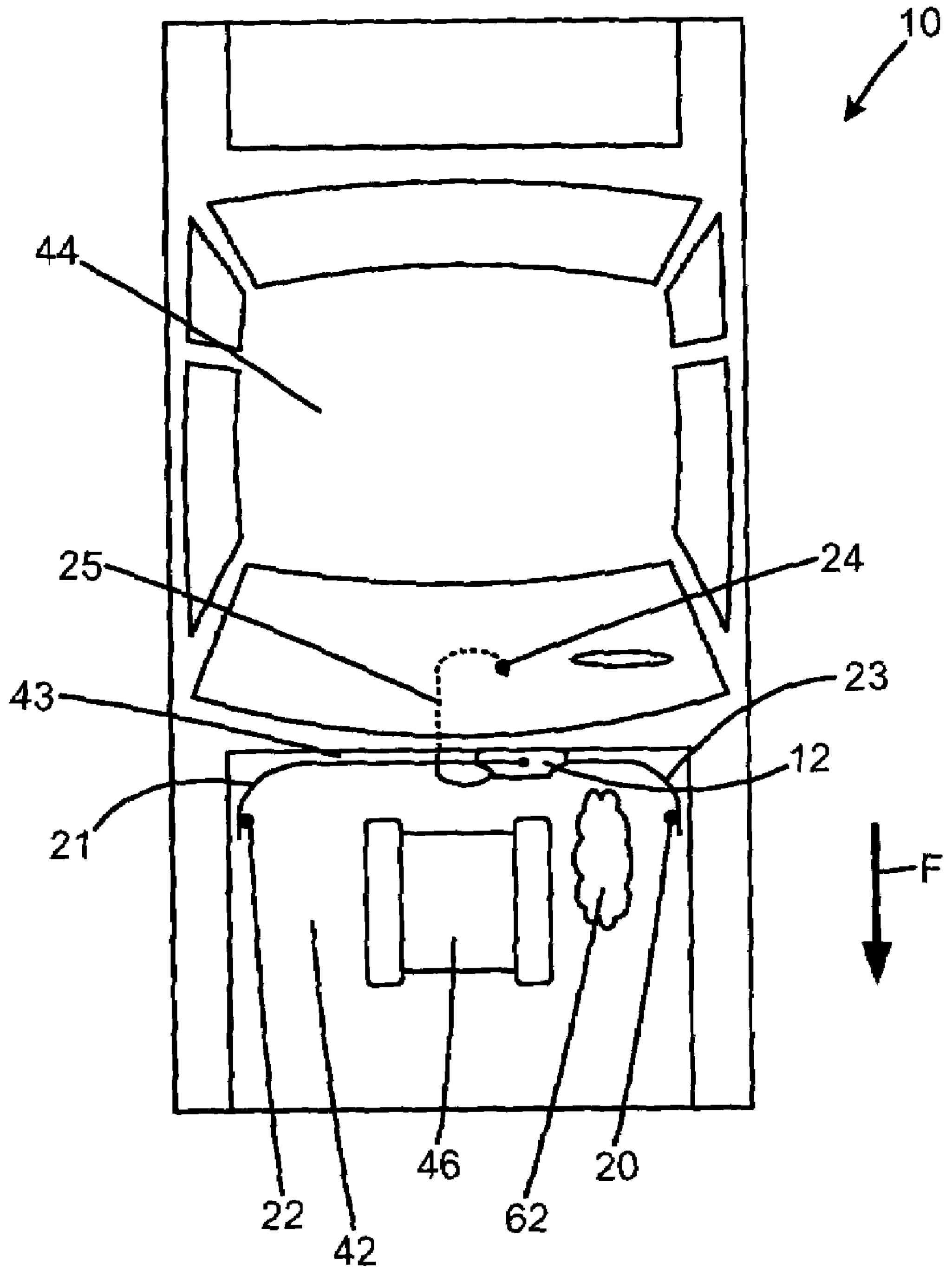
FIG. 2 is a schematic top view of the fire alert system mounted in a vehicle.

With reference to FIGS. 1–2, the onboard fire alert system 10 of the present invention has a programmable central unit 12 with connectors 14, 16, 18 for connecting thermo-electric sensors 20, 22, 24 via wires 21, 23, 25. The central unit 12 may be located in any suitable place such as inside the vehicle or close to the engine. The sensors 20, 22 may be located on each side of the engine 46 in the engine compartment 42. It should be understood that the present invention is not limited to vehicles with engine compartments but also includes vehicles that lack confined engine compartments. The sensor 24 may be located below the engine 46 of the vehicle 44. The unit 12 has adjustment buttons 26, 28, 30 for setting the temperature ranges of each sensor 20, 22 and 24. In this way, the central unit 12 may be set to trigger a replaceable smoke generator 41 when the sensors sense different temperatures. The smoke generator 41 may be mounted on the central unit 12 or be separate from the central unit. The unit 12 has a display 32 for displaying information such as the temperature and a switch 34 that is switchable between a set mode 36, a run mode 38 and an engage mode 40. The set mode 36 may be used to set the trigger temperatures for the sensors. The run mode 38 may be used to determine the normal temperatures sensed by the temperatures when the vehicle and engine are operating normally. The engage mode 40 be use once the normal and trigger temperatures have been determined and the vehicle is used such as racing with a racing car. The display may, for example, display the current sensed temperature of each sensor and the set trigger temperature for each sensor at which the smoke generator 41 is triggered. An important feature of the unit 12 is the smoke generator 41 that may be used to generate visible smoke since the smoke from alcohol fueled smoke is virtually invisible to the human eye.

The central unit 12 is programmable and includes suitable electronics. The central unit 12 is battery driven and includes a low battery warning display to make it independent of power supply from external power sources. Preferably, the sensors 20, 22, 24 may be mounted on in different areas around the engine 46 that is run on a suitable type of alcohol such as methanol or ethanol. The sensors should be mounted in places where there is the highest risk of engine fires occurring. Since the vehicle 44 is running in a forward direction (F) suitable places for the sensors 20, 22 may be close to the corners of the compartment 42 and below the engine 46.

In operation, the unit 12 may be put into the run mode 38 to be test run together with the vehicle 44 so as to determine the normal temperatures of the sensors 20, 22, 24 when the engine 46 is run at normal racing speed conditions. For example, the sensors may sense normal temperature 48, 50, 52, respectively. Based on the normal temperatures, trigger temperatures 54, 56, 58 may be set by switching to the set mode 36. Preferably, the trigger temperatures 54, 56, 58 are about 50–75 degrees Celsius above the normal temperatures 48, 50, 58 as sensed by each respective sensor 19, 20, 22, 24.

When one of the sensors 20, 22, 24 senses the trigger temperature and sends back this information, the unit 12 provides the smoke generator 41 with current so as to turn on the generator 41 to start generating a visible smoke 60. For example, the smoke 60 may be colored with a color added to the generator 41 such as red or any other suitable color. The generator 41 may be designed so as to generate different color smoke depending upon which fuel is used so that the best fire extinguishing chemicals are used to combat the fire.

In this way, an alcohol fueled fires may be discovered at an early stage although the smoke is almost invisible and the fire extinguishing procedures may be started right away to save life and equipment.

While the present invention has been described in accordance with preferred compositions and embodiments, it is to be understood that certain substitutions and alterations may be made thereto without departing from the spirit and scope of the following claims.

What is claimed is:

1. A method of warning for alcohol fueled fires, comprising:

providing a vehicle (44) with an engine (46) fueled by alcohol;

mounting sensors (20, 22, 24) adjacent to the engine;

the sensors sensing a trigger temperature (54, 56, 58) of an alcohol-fueled fire (62) and sending a signal to a central unit (12); and the central unit activating a smoke generator (41) to generate a visible smoke (60) in response to the trigger temperature sensed by the sensors.

2. The method according to claim 1 wherein the method further comprises activating adjustment buttons (26, 28, 30) for setting temperature ranges of the sensors.

3. The method according to claim 2 wherein the method further comprises displaying the temperature ranges on a display (32).

4. The method according to claim 3 wherein the method further comprises switching the central unit (12) between a set mode (36), a run mode (38) and an engagement mode (40).

5. The method according to claim 1 wherein the method further comprises mounting the sensors in an engine compartment (42) of the vehicle (44).

6. The method according to claim 5 wherein the method further comprises placing the sensor (24) below the engine (46).

7. The method according to claim 1 wherein the method further comprises the sensors sensing normal temperatures (48, 50, 52) and setting the trigger temperatures (54, 56, 58) higher than the normal temperatures, the trigger temperatures triggering the smoke generator (41) to generate the visible smoke (60).

8. The method according to claim 7 wherein the method further comprises adding a color to the smoke generator (41) to color the smoke (60).

9. The method according to claim 1 wherein the method further comprises placing the sensors (20, 22) on each side of the engine (46).

* * * * *